Oct. 23, 1934.  F. E. E. BOOSS  1,978,185
INDICATOR FOR STORAGE BATTERIES
Filed June 11, 1931

Inventor,
Frederick E. E. Booss.
By Ernest F. Mechlin
Attorney

Patented Oct. 23, 1934

1,978,185

UNITED STATES PATENT OFFICE 1,978,185

INDICATOR FOR STORAGE BATTERIES

Frederick E. E. Booss, Lancaster, N. Y., assignor to Gould Storage Battery Corp., Depew, N. Y., a corporation of Delaware Application June 11, 1931, Serial No. 543,724

3 Claims. (Cl. 265—45)

The invention relates to condition or degree of charge indicators for storage batteries, involving a calibrated hydrometer mounted for free longitudinal movement in a transparent tubular container adapted to be immersed in the electrolyte and held in position by frictional engagement with the plate assembly and the inner wall of the jar, or by attachment to the battery cell cover or top, or plate assembly, said container being provided with upper and lower openings to insure free circulation of the electrolyte therein.

The principal object of the invention is to provide a storage battery charge or condition indicator adapted to be manufactured and sold as a complete and separate entity, that is to say separate from or forming no part of a battery in which it is to be used, the device being adapted to be simply mounted in an already existing storage battery.

A very important object of the invention is to provide an indicator of this type which is preferably entirely immersed within the electrolyte at any desired depth, the device embodying a container apertured to permit circulation of the electrolyte therein but of such construction as to provide an air or gas chamber or trap which will provide a different level for the electrolyte within the container as compared with the level in the battery itself.

The invention is illustrated in the accompanying drawing, in which:—

Figure 1:
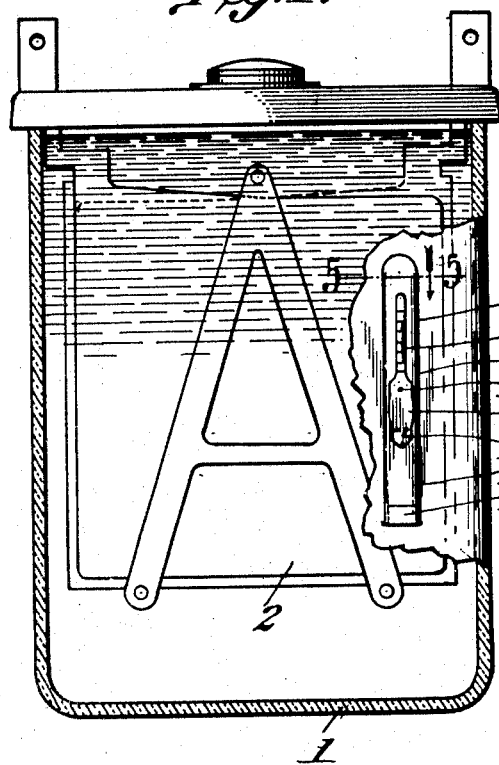
Fig. 1 is a broken elevation of a storage battery having the invention applied thereto.
Figure 2:
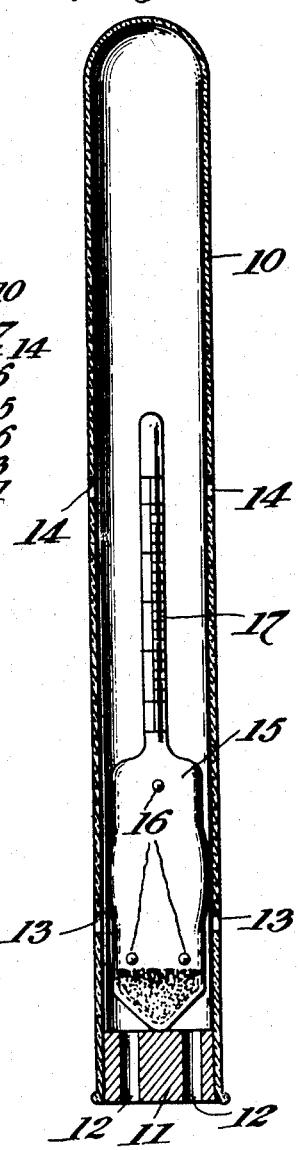
Fig. 2 is a sectional elevation of the indicator assembly.
Figure 3:
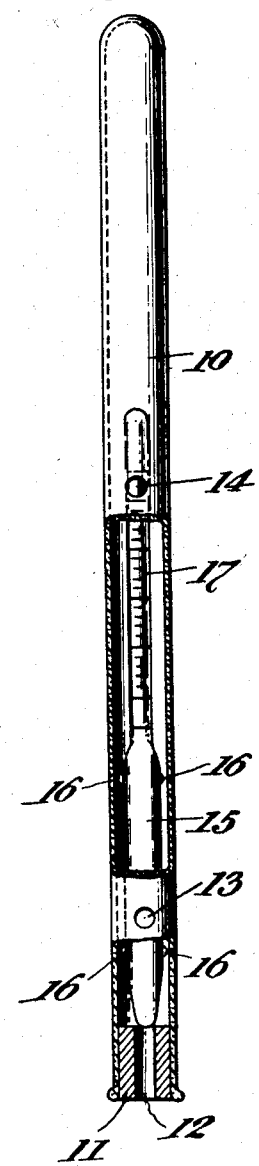
Fig. 3 is a side view of the latter, broken away in parts.
Figure 4:
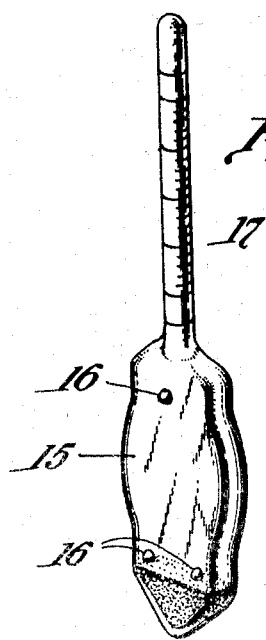
Fig. 4 is a perspective view of a typical hydrometer.

Referring to the drawing, 1 indicates the transparent jar or cell of a typical storage battery and 2 indicates the plates assembly therein, the plates being immersed in the usual electrolyte. In batteries of this general type, it has been proposed to install indicators of the ball type to show when the battery was fully charged or when the charge fell below a certain point, as evidenced by changes in the specific gravity of the electrolyte, the changes being manifested by the ball rising or sinking in the electrolyte. While such indicators have proven sufficient to show that a battery either has a sufficient charge or is in need of recharging, they are ineffective to show the exact state or condition of the charge, such as would be evidenced by a calibrated hydrometer immersed in the electrolyte. The principal advantage of the ball type of indicator is that it forms a part of the battery installation and is available for inspection at all times through the transparent walls of the jar or container. The purpose of the present invention is to provide an indicator possessing all of the advantages of the ball type, together with the additional advantage that it will show the exact state or condition of the charge in a battery, as manifested by the specific gravity of the electrolyte as shown on the indicating scale of a calibrated hydrometer.

The invention, in its simplest form, is illustrated in the drawing and involves a transparent tubular container 10 of glass or other suitable material that is inert to the electrolyte, said container having two flat sides, a closed top and an open bottom, which latter is provided with a plug 11 having one or more perforations 12 therethrough. The lateral walls of the container 10 are provided with upper and lower perforations 13 and 14 which insure free circulation of the electrolyte in the container, when the latter is immersed in the electrolyte.

Figure 5:
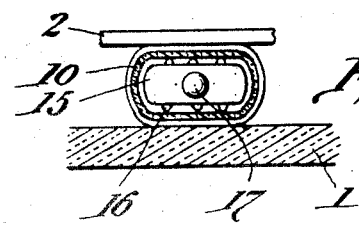
Fig. 5 is a section on line 5—5 of Fig. 1.

Mounted for free longitudinal movement within the container 10 is a hydrometer of the float type having the weighted bulb 15 at its bottom, which bulb is preferably flattened on two faces to conform generally to the flat sided tube or container 10, the said faces being furnished with projecting studs or extrusions 16, which space the bulb from the interior walls of the container and prevent the hydrometer sticking to said walls. The bulb 15 is provided with an upwardly extending stem 17, which carries the usual scale which indicates the specific gravity of the electrolyte in which the hydrometer is immersed. In applying the indicator to its intended use, it is inserted in the storage battery between one lateral face of the plate assembly and the adjacent inner wall of the transparent jar, the tubular container 10 being held by frictional engagement between the walls of the jar and the plate assembly, as indicated in Figs. 1 and 5, with the container 10 completely submerged in the electrolyte. When so disposed, the electrolyte circulates freely through the container by way of the openings in the plug 11 and the openings 13 and 14 in the container, so that the hydrometer is subject and directly responsive to changes in the specific gravity of the electrolyte and will rise and fall in the container in response to such changes, the specific gravity of the electrolyte and, therefore, the condition of charge of the battery being clearly observable on the indicating hydrometer scale through the transparent walls of the jar 1 and the container 10. Should it be found inexpedient to retain the indicator in proper position in the battery by means of frictional engagement between the container 10 and the plate assembly and the inner wall of the jar, the container 10 may be provided with an extension or attachment on its top, which may be engaged with an opening in the top or closure of the jar, or attached to the plate assembly.

Container 10 may also be a tube closed at its upper end by means of a plug or stopper.

The electrolyte level in container 10 is maintained at an approximate constant level adjacent to upper opening 14 by the locking of air, or gases given off from the battery plates, in the upper closed portion of container 10. This action provides a separate electrolyte level for the action of the hydrometer float, irrespective of the electrolyte level of the cell itself. It is understood that container 10 may be entirely or only partially submerged below the electrolyte level of the cell.

What I claim is:

1. A specific gravity indicator comprising a transparent tube adapted to be immersed within a liquid to be tested, said tube having its upper end closed and its lower end apertured, said tube being formed in its sides with upper and lower holes, the former being spaced downwardly from the closed upper end of the tube to provide a gas and air trap within the upper portion of the tube, and a hydrometer mounted for free longitudinal movement in said tube, said trap providing a liquid level within the tube different from that of the liquid in which the tube is immersed.

2. A specific gravity indicator adapted to be immersed within a liquid to be tested, comprising a container having a transparent side, said container being closed at its top and having its bottom apertured, said container being provided in its side with an upper hole spaced downwardly below the closed top to define an air and gas trap and being further formed with a hole spaced vertically below the upper hole to permit circulation of liquid through the lower portion of the container, and a hydrometer mounted for free vertical sliding movement within the container, said trap providing a liquid level within the container different from that of the liquid in which the device is immersed.

3. A specific gravity indicator comprising a container having a transparent side designed to be entirely submerged within a liquid to be tested, said container having its upper end closed and being provided in its side with upper and lower openings the upper one of which is spaced below the closed upper end of the container to provide a gas and air trap within the upper portion, and a hydrometer mounted for free longitudinal movement in said container, said trap providing a liquid level within the container different from that of the liquid in which the container is submerged.

FRED'K E. E. BOOSS.